United States Patent
De Brey

[11] 3,842,791
[45] Oct. 22, 1974

[54] PARTICLE FLOW MONITOR

[76] Inventor: Robert J. De Brey, 4502 Browndale Ave., Minneapolis, Minn. 55424

[22] Filed: July 3, 1972

[21] Appl. No.: 268,538

Related U.S. Application Data

[63] Continuation-in-part of Ser. No. 37,157, May 14, 1970, Pat. No. 3,674,316.

[52] U.S. Cl. .................. 116/67 R, 73/28
[51] Int. Cl. .......................... G08b 3/02
[58] Field of Search........ 73/194 A, 194 B, 28, 214; 340/239 R; 181/DIG. 1; 179/181 F; 302/65; 15/415; 138/104; 285/93; 116/67 R, 112, 117 R

[56] References Cited
UNITED STATES PATENTS
1,633,598  6/1927  McClatchie........................ 15/415
1,689,030  10/1928  Holland........................... 181/32 R
3,172,498  3/1965  Gorike........................... 181/DIG. 1
3,669,214  6/1972  Matsuura et al................... 181/32 R Primary Examiner—Charles A. Ruehl

[57] ABSTRACT

A particle flow monitor mounted on a housing having a passage for carrying moving fluid and particles produces audio signals that are in proportion to the amount of particles moving with the fluid. The monitor has a sensing unit having one or more enclosed chambers or cells closing an open end of the housing. A portion of the sensing unit is exposed to a flow chamber within the housing. Particles that impinge on the portion of the sensing unit produce an audio signal which provides audio information feedback as to the amount of particles moving with the fluid.

17 Claims, 13 Drawing Figures

PATENTED OCT 22 1974 3,842,791
SHEET 2 OF 2

PARTICLE FLOW MONITOR

CROSS REFERENCE TO RELATED APPLICATION

This application is a continuation-in-part of U.S. application Ser. No. 37,157, filed May 14, 1970, now U.S. Pat. No. 3,674,316.

BACKGROUND OF THE INVENTION

Particle monitoring devices using visual, audio, electronic parameters are used to detect particles in moving fluids. Vacuum cleaner lines have been provided with particle or dirt traps which function as settling chambers for receiving the relatively heavy particles moving in the air stream. An example of this vacuum cleaner trap is shown in U.S. Pat. No. 3,267,650. Some vacuum lines have been provided with settling chambers for observing and separating heavy objects from a moving air stream. An example of this structure is shown in U.S. Pat. No. 944,779. The use of a visual window, or other visual indicating means, for the purposes of monitoring the amount of particles in a moving air stream, has proven ineffective, as the window material, glass or other transparent medium becomes clouded. Efforts to overcome the inadequacies of the visual monitoring systems have been made by the use of a small circular rigid diaphragm, which will produce some audible sounds to provide an indication of dust or dirt in the air stream. An example of this structure is shown by McClatchie in U.S. Pat. No. 1,633,598.

Tests have shown that the McClatchie particle monitoring device operates at a resonant frequency that is substantially higher than the frequency of the highest human audio sensitivity. The McClatchie device peaks at 8 $KH^2$, has a relatively low sound output and is inoperative in slow moving air as it does not produce an audible output signal. The diaphragm of the McClatchie device collects dirt particles on the impaction surface fairly quickly. The accumulation of particles on the inside surface of the diaphragm dampens the sound output. In order to provide for an effective monitoring of the particles, the McClatchie diaphragm must be removed and cleaned as it does not have self-cleaning characteristics.

SUMMARY OF THE INVENTION

The invention relates to a particle monitoring apparatus operable to provide an information feedback which is in direct relationship to the amount of particles moving with a fluid, as air. The monitoring apparatus has a particle sensing means located in general alignment with the longitudinal axis of the flow of fluid carrying the particles. The sensing means is a structure having at least one hollow chamber or cell. An inner or active portion of the sensing means is exposed to the flow of fluid carrying the particles. The particles moving with the fluid strike the active portion of the sensing means, producing an audio signal. The audio signal is transmitted through the sensing device which produces a sound which can be detected with the human ear. The intensity of the sound provides information as to the movement of particles in the fluid moving past the sensing means. In one form of the device, the sensing means is a hollow member having a single chamber. In another form of the device, the sensing means has a plurality of closed chambers or cells formed from an expanded foam plastic, glass or metal.

IN THE DRAWINGS

Figure 2:
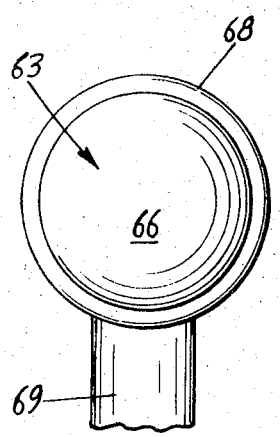
FIG. 2 is a front elevational view of the particle monitoring apparatus of FIG. 1.
Figure 1:
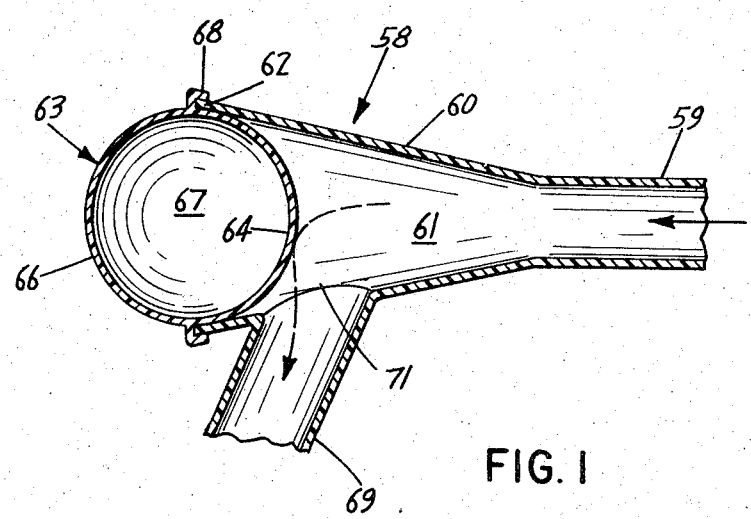
FIG. 1 is a diagrammatic view of the particle monitoring apparatus of the invention.

Referring to FIGS. 1 and 2, there is shown a particle monitoring apparatus, indicated at 58, for sensing particles moving with a fluid, as air. Apparatus 58 has an inlet tube 59 connected to the inlet portion of a funnel-shaped housing 60 having an expansion chamber 61. Housing 60 has a generally cone-shaped inside wall that increases in transverse diameter as a function of distance from the inlet passage of tube 59. The large outer end 62 of the funnel-shaped housing 60 carries a particle sensing means, indicated generally at 63. The sensing means 63 is a hollow spherical member or hollow ball having an active inside spherical curved wall 64 projected into the expansion chamber 61 and an outside spherical wall 66 extended outwardly from the expansion chamber 61. The inside of the ball is hollow and has a chamber 67 which may contain a sound transmitting medium, as liquid or gas. The medium can be under pressure other than atmospheric. Mounted on the outer periphery of the ball is an attaching ring 68 which cooperates with the outer end 62 of the funnel-shaped housing 60 to mount the ball on the housing. Other mounting structure can be used to attach the ball on the housing.

Secured to the lower portion of the housing is an outlet tube 69 having an exit opening 71 adjacent the lower portion of the inside wall 64. The particles flowing into the expansion chamber 61 will strike the inside wall 64 of the ball. The sound and energy signals created by the impaction of the particles on the inside wall 64 are transmitted through the ball chamber 67 to the outside wall 66. Energy signals are emitted as sound signals. These sound signals are indicative of the amount of particles entrained in the air flowing through the expansion chamber 61.

Figure 4:
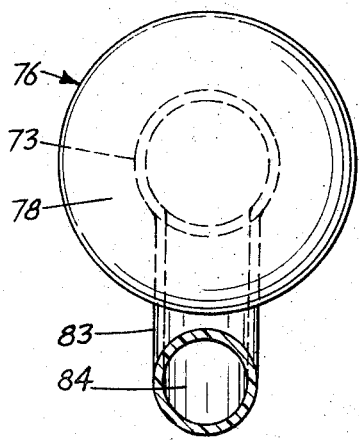
FIG. 4 is a front elevational view of the particle monitoring apparatus of FIG. 3.
Figure 3:
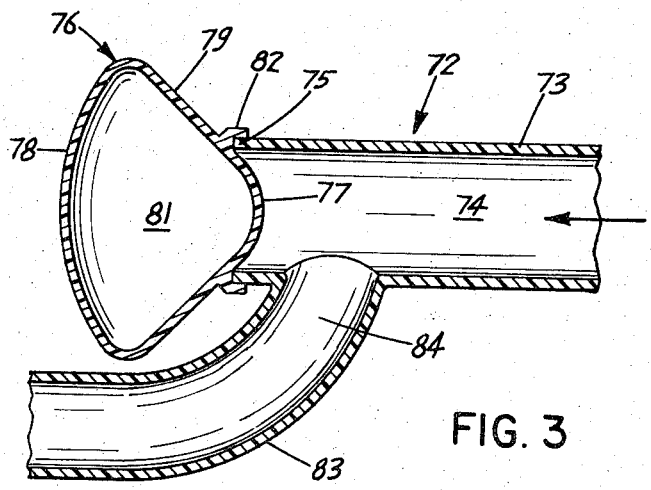
FIG. 3 is another diagrammatic view of the particle monitoring apparatus of the invention.

Referring to FIGS. 3 and 4, there is shown another particle monitoring apparatus of the invention, indicated generally at 72, for providing information as to the amount of particles flowing with fluid, as air, moving through the apparatus. Apparatus 72 has an inlet tube 73 with an inlet passage 74. A particle sensing means, indicated generally at 76, is connected to the open end 75 of the tube 73. The particle sensing means 76 is a hollow member having an active inside wall 77 projected into the passage 74. The inside wall 77 is joined to a funnelshaped outwardly directed side wall 79. A large slightly convex front wall 78 is attached to the side wall 79 and encloses a chamber 81 of the hollow member. An attaching ring 82 on the side wall 79 secures the particle sensing means 76 to the end 75 of the tube 73.

Joined to the tube 73, adjacent the particle sensing means 76, is an outlet tube 83 having an exit passage 84 open to the passage 74 of the inlet tube adjacent the inside wall 77. The particles flowing through the passage 74 strike the inside wall 77 of the particle sensing means 76 before they change direction and flow through the exit passage 84. The impaction of the particles on the inside wall 77 creates audio information signals which are transmitted through the chamber 81 and are emitted from the front wall 78. The funnel-shaped side wall 78 functions to amplify and focus the sound energy in the particle sensing means 76.

Figure 6:
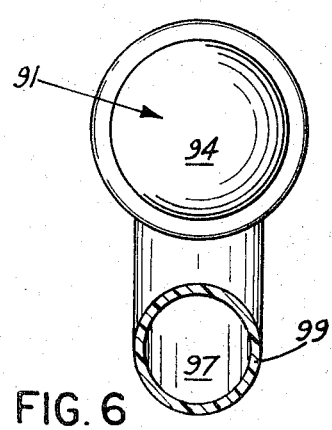
FIG. 6 is a front elevational view of the particle monitoring apparatus of FIG. 5.
Figure 5:
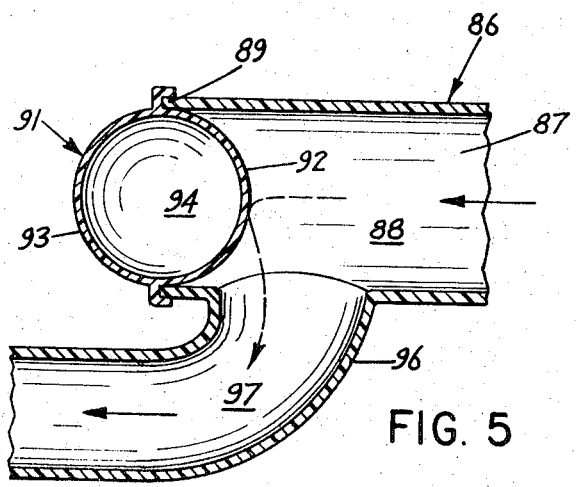
FIG. 5 is a further modification of the particle monitoring apparatus of the invention.

Referring to FIGS. 5 and 6, there is shown a further modification of the particle monitoring apparatus, indicated generally at 86. Apparatus 86 has an inlet tube 87 having an inlet passage 88 and an open end 89. A particle sensing means, indicated generally at 91, is located in the end 89 to close the end of the passage 88. The particle sensing means 91 is a spherical hollow member or ball. The hollow member has an inside active semi-spherical wall 92 projected into the passage 88. Opposite the wall 92 is an outside semi-spherical wall 93 which functions as an energy emitting surface to transmit sound to the operator of the device. The hollow member has a chamber 94 between the inside wall 92 and outside wall 93. An outer peripheral diameter of the hollow member 91 is located with a tight frictional fit into the end 89 of the tube 87. Other attaching structures can be used to mount the hollow member 91 to the tube 87. The device 86 operates in the same manner as particle monitoring device 58 shown in FIGS. 2 and 3.

Particle sensing means 63, 76 and 91 may be formed from rigid plastic material, metal, glass or the like. Alternatively, the particle sensing means 63, 76 and 91 may be formed of deformable sheet material, as disclosed in my co-pending U.S. patent application Ser. No. 252,323, filed May 10, 1972. The disclosure of this application is incorporated herein for reference. The deformable sheet material provides the active surfaces 64, 77 and 92 of the sensing means 63, 76 and 91 with self-cleaning characteristics. The active surfaces 64, 77 and 92 can be flat and/or inclined toward the exit passages. Also, part of the sensing means 63, 76 and 91 may be rigid and other parts flexible and deformable.

Figure 7:
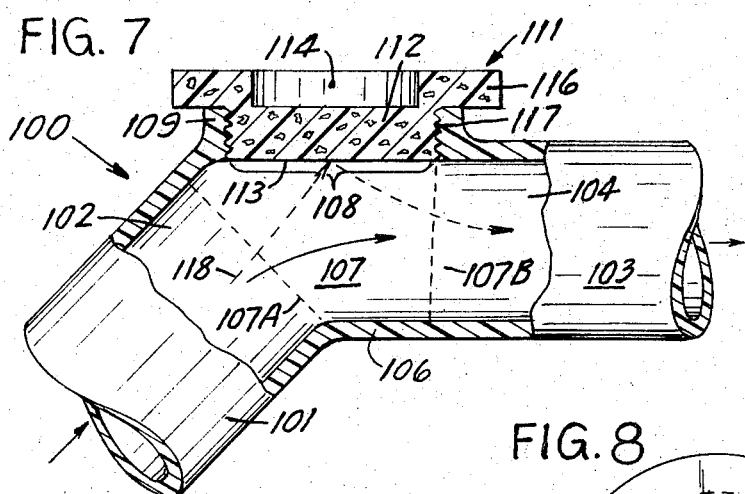
FIG. 7 is a longitudinal side elevational view, partly sectioned, of another modification of the particle monitoring apparatus of the invention.
Figure 8:
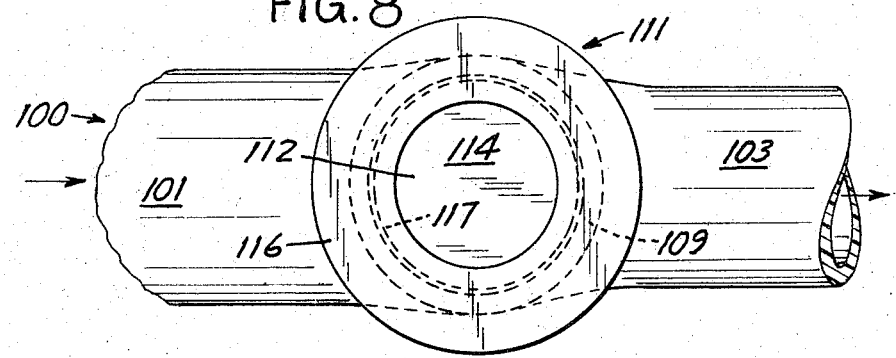
FIG. 8 is a top plan view of FIG. 7.

Referring to FIGS. 7 and 8, there is shown a particle monitoring apparatus indicated generally at 100 operable to produce a readable audio signal related to movement of fluid and particles through the apparatus. Apparatus 100 has a first or inlet tube 101 having an inlet passage 102. Located at an acute angle relative to the inlet tube 101 is an outlet or exit tube 103 having an exit passage 104.

Connecting structure or housing 106 joins tubes 101 and 103 together. Tubes 101 and 103 and housing 106 can be a single member. Housing 106 has a chamber 107 in communication with both inlet passage 102 and exit passage 104 whereby fluid and particles carried by the fluid move freely through the apparatus. The chamber 107 is shown in FIG. 7 between the transverse broken lines 107A and 107B. The top section of housing 106, as shown in FIG. 7, has an opening 108 in general alignment with the longitudinal axis of inlet passage 102. An upright annular flange 109 surrounds opening 108.

A particle sensing means indicated generally at 111 is mounted on the flange 109 closing opening 108. Sensing means 111 functions to establish an audio readable output signal that is related to the amount of particles that strike the sensing means. Sensing means 111 has a body 112 having an active inside surface 113 exposed to chamber 107. Surface 113 is at a forwardly inclined angle with respect to the longitudinal axis of inlet passage 102 and in general parallel alignment with the longitudinal axis of exit passage 104. Surface 113 has a larger area than the cross sectional area of inlet passage 102. This increased size of the impact surface provides greater effectiveness of the particle sensing means. The top or outer side of body 112 has a recess 114 and a laterally projected annular flange 116. The recess 114 and flange 116 provide the outer side of the body 112 with an exposed outside surface area that is greater than the surface area of active surface 113. For example, the outside surface area may be four times greater than the active inside surface area. Recess 114 has a circular shape. Other shapes and contours, as flat, convex, or stepped, can be used in lieu of recess 114. The outer peripheral portion 117 of body 112 has a screw thread configuration whereby the sensing means 111 can be removed from housing flange 109.

Body 112 is a one-piece member having a plurality of separate chambers, cells or closed cavities. Preferably, body 112 is an expanded rigid foamed plastic, as polystyrene. Other cellular materials as expanded glass, metal and synthetic materials can be used to make the body 112.

In use fluid and particles in the fluid are continuously flowing through the chamber 107. As the fluid moves through chamber 107, its flow path curves toward exit passage 104. The momentum of the heavier particles carries the particles toward surface 113 of the sensing means 111. As shown with broken arrow 118, the particles impinge on or strike the surface 113. The impaction of particles on surface 113 produces a sound or audio signal that is transmitted through body 112 and emanates from the outside surface area. The resultant audio or sound output is detectable by the human ear to provide information related to the amount of particles passing through the apparatus.

Figure 9:
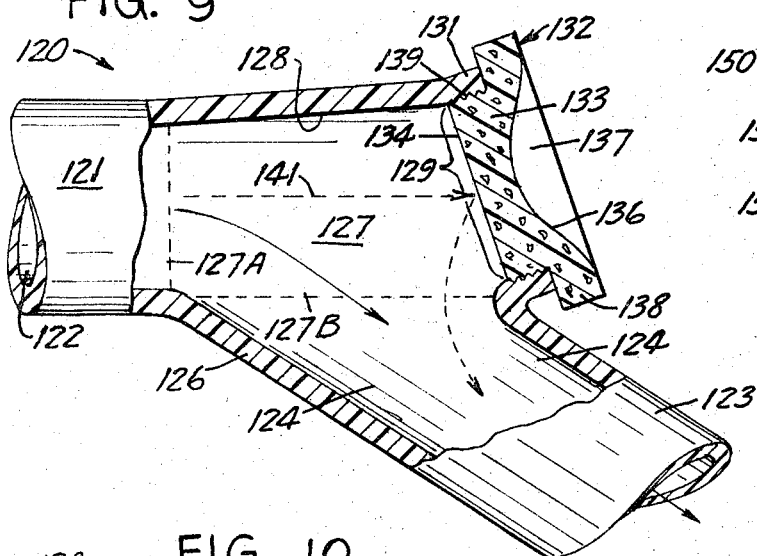
FIG. 9 is a longitudinal side elevational view, partly sectioned, of a further modification of the particle monitoring apparatus of the invention.
Figure 10:
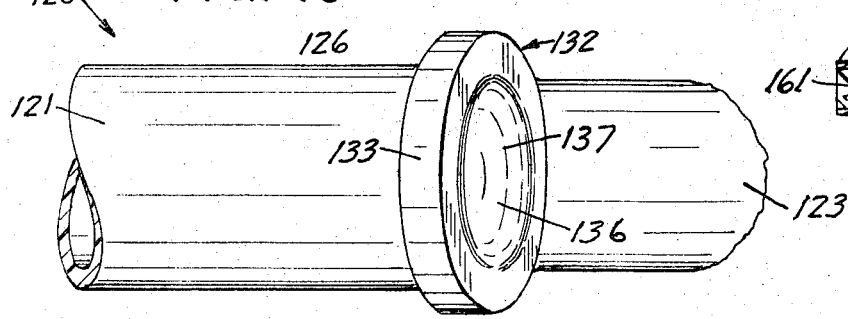
FIG. 10 is a top plan view of FIG. 9.

FIGS. 9 and 10 show a modification of the particle monitoring apparatus 100, indicated generally at 120. Apparatus 120 has an inlet tube 121 surrounding an inlet passage 122. An exit tube 123 having an exit passage 124 projects at an acute angle from the inlet tube 121. Connecting structure or housing 126 joins the inlet tube 121 with the exit tube 123. Tubes 121 and 123 and housing 126 can be a single member, of metal or plastic or the like. Housing 126 has a chamber 127 surrounded by a funnel-shaped or outwardly tapered inside wall 128. Chamber 127 is in communication with inlet passage 122 at transverse broken line 127A and with outlet passage 124 at transverse broken line 127B so that fluid and particles will freely flow through the apparatus. Wall 128 increases in transverse diameter as a function of longitudinal distance from inlet tube 121. Thus, chamber 127 increases in size toward an opening 129 and is a fluid expansion chamber. As shown in FIG. 9, opening 129 is in general longitudinal alignment with the longitudinal axis of inlet passage 122.

Housing 126 has an end 131 surrounding opening 129 carrying a particle sensing means indicated generally at 132. Sensing means 132 functions to establish an audio readable output signal that is related to the amount of particles that strike the sensing means. Sensing means 132 has a body 133 having an active inside surface 134 exposed to chamber 127 and an outside surface 136. Surface 134 is at a forwardly inclined angle with respect to the longitudinal axis of inlet passage 122 and in general parallel alignment with the longitudinal axis of exit passage 124. The top or outer side surface 136 or body 133 has a recess 137 and a laterally projected annular flange 138. The recess 137 and flange 138 provide the outer side surfaces 136 of the body 133 with an exposed outside surface area that is greater than the surface area of active surface 134. For example, the outside surface area may be four times greater than the active inside surface area. Recess 137 has a concave semi-spherical shape which directs and focuses audio signals outwardly from the body 133. Other shapes and contours, as flat, convex, or stepped, can be used in lieu of recess 137. The outer peripheral portion 139 of body 133 has a screw thread configuration whereby the sensing means 132 can be removed from housing end 131.

Body 133 is a one-piece member having a plurality of separate chambers, cells or cavities. Preferably, body 133 is an expanded rigid foamed plastic, or polystyrene. Other cellular materials as expanded glass, metal and synthetic materials can be used to make the body 133.

In use fluid and particles in the fluid are continuously flowing through the chamber 127. As the fluid moves through chamber 127, its flow path curves toward exit passage 124. The momentum of the heavier particles carries the particles toward surface 134 of the sensing means 133. As shown with broken arrow 141, the particles impinge on or strike the surface 134. The impaction of particles on surface 134 produces a sound or audio signal that is transmitted through body 133 and emanates from the outside surface 137. The resultant audio or sound output is detectable by the human ear to provide information related to the amount of particles passing through the apparatus.

Figure 11:
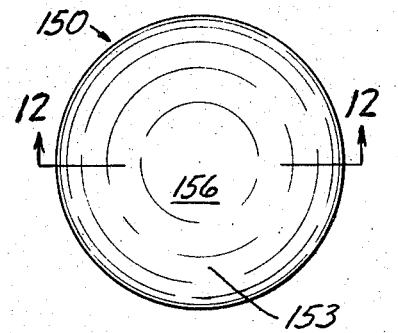
FIG. 11 is a top plan view of another sensing means usable with the particle monitoring apparatus of FIGS. 7 and 9.
Figure 12:
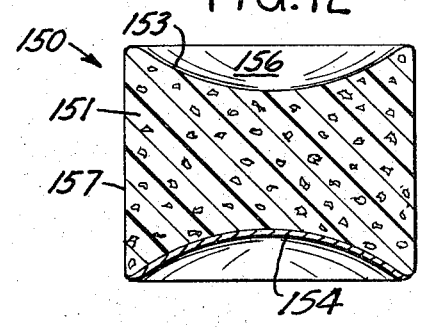
FIG. 12 is a sectional view taken along line 12—12 of FIG. 11.

A particle sensing means, indicated generally at 150 in FIGS. 11 and 12 can be used in lieu of particle sensing means 111 and 132 in the monitors shown in FIGS. 7 and 9. Sensing means 150 has a body 151 of cellular material, as rigid expanded foamed plastic, glass or metal, having an inside surface 152 and an outer surface 153. For example, body 151 can be rigid expanded polystyrene. Inside surface 152 has a concave shape and carries a sheet member 154. Member 154 is attached to surface 152 with bonding material or an adhesive. Member 154 is an impact and abrasion-resistant material, as metal foil, sheet plastic or coating of silicon or Teflon. Outer surface 153 has a concave shape forming a hemispherical recess 156. Body 151 has an outer side wall 157 attachable to the housings 106 and 126 shown in FIGS. 7 and 9. Body 151 may be provided with an outwardly directed lateral annular flange or lip to increase the area of the outer surface 153.

Figure 13:
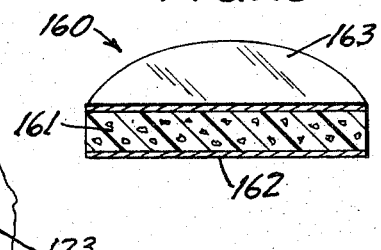
FIG. 13 is a fragmentary sectional view of another form of sensing means.

FIG. 13 shows a modification of the particle sensing means 160 usable with the monitors shown in FIGS. 7 and 9. Sensing means 160 has a body or core 161 of expanded rigid foamed material having a plurality of closed cells or chambers. An inside sheet member 162, as metal foil, plastic, paper or the like, is bonded to one side of the core 161. A sheet member 163, as metal foil, plastic, paper or the like, is bonded to the opposite side of core 161. Members 162 and 163 may be a continuous layer or film of core material closing the surface cells of the core material. Sensing means 160 is a one-piece generally flat member having the shape of a circular disc. Other shapes and thicknesses can be used for sensing means 160.

The embodiments of the invention in which an exclusive property or privilege is claimed are defined as follows:

1. An apparatus for sensing particles in a flowing fluid comprising: first means having a passage for carrying fluid; second means having a second passage for carrying fluid; connecting means joining the first means with the second means, said connecting means comprising a housing having an inside wall surrounding a chamber open to the first passage and a second passage whereby fluid and particles flow through said chamber, said housing having an inlet opening in communication with the first passage and an open end opposite the inlet opening, said inside wall of the housing tapers outwardly whereby the chamber increases in size as a function of distance from the inlet opening into the chamber, particle sensing means located across the open end of said chamber opposite the inlet opening for producing audio signals related to the amount of particles which hit the sensing means, said sensing means comprising a member having at least one enclosed cell, a first particle impaction surface located adjacent one side of and facing the chamber whereby said first surface does not interfere with the flow of fluid and particles through said chamber, a portion of said particles flowing through said chamber hit said first particle impaction surface producing the audio signals, and a second surface located outside the chamber, said enclosed cell being located between said first surface and said second surface.

2. The apparatus of claim 1 wherein: the member of the sensing means is a foamed body having a plurality of enclosed cells.

3. The apparatus of claim 2 wherein: the body has a recess in its outer surface forming said second surface.

4. The apparatus of claim 2 wherein: the body has an annular lateral flange to increase the surface area of its outer surface forming said second surface.

5. The apparatus of claim 2 wherein: the body has means to increase the surface area of its outer surface forming said second surface.

6. An apparatus for sensing particles in a flowing fluid comprising: means having a chamber through which fluid and particles can flow and an opening, particle sensing means located in said opening for producing audio signals related to the amount of particles which hit the sensing means, said sensing means comprising a member having at least one enclosed cell, a first particle impaction surface facing the chamber upon which particles hit, said first particle impaction surface located adjacent one side of said chamber whereby said first surface does not interfere with the flow of particles and fluid through said chamber, and a second surface located outside the chamber for transmitting audio signals to the surrounding environment, said enclosed cell being located between said first surface and said second surface, said member of the sensing means being a foamed body having a plurality of enclosed cells, said body having a recess in its outer surface forming said second surface.

7. An apparatus for sensing particles in a flowing fluid comprising: means having a chamber through which fluid and particles can flow and an opening, particle sensing means located in said opening for producing audio signals related to the amount of particles which hit the sensing means, said sensing means comprising a member having at least one enclosed cell, a first particle impaction surface facing the chamber upon which particles hit, said first particle impaction surface located adjacent one side of said chamber whereby said first surface does not interfere with the flow of particles and fluid through said chamber, and a second surface located outside the chamber for transmitting audio signals to the surrounding environment, said enclosed cell being located between said first surface and said second surface, said member of the sensing means being a foamed body having a plurality of enclosed cells, said body having means to increase the surface area of its outer surface forming said second surface.

8. The apparatus of claim 7 wherein: the means on said body to increase the surface area includes an annular laterally outward flange.

9. The apparatus of claim 7 wherein: the means having a chamber includes an inside wall which tapers outwardly whereby the chamber increases in size as a function of distance toward said opening.

10. An apparatus for sensing particles moving with a flowing fluid comprising: a housing having an inside wall surrounding a chamber providing a passage for carrying fluid and particles, an inlet into the chamber, an outlet from the chamber, and an opening to the chamber; said inside wall of the housing tapering outwardly from the inlet toward the opening whereby the chamber increases in size as a function of distance from the inlet, particle sensing means located across the opening and closing the opening, said sensing means having a member having at least one enclosed space, a first particle impaction surface upon which particles moving with the flowing fluid can impinge thereby producing audio signals, said first particle impaction surface located adjacent one side of said chamber whereby said first surface does not interfere with the flow of particles and fluid through said chamber, and a second surface spaced from the first surface for transmitting the audio signals to the surrounding environment.

11. The apparatus of claim 10 wherein: the first surface has a smaller area than the area of the second surface.

12. The apparatus of claim 10 wherein: the member is a foamed body having a plurality of enclosed cells.

13. The apparatus of claim 12 wherein: the body has a recess in its outer surface forming said second surface.

14. The apparatus of claim 12 wherein: the body has an annular lateral flange to increase the surface area of its outer surface forming said second surface.

15. The apparatus of claim 12 wherein: the body has means to increase the surface area of its outer surface forming said second surface.

16. The apparatus of claim 10 wherein: the member is a foamed plastic body having an annular lateral outward flange to increase the surface area of the second surface, said surface area of the second surface being substantially larger than the surface area of the first surface.

17. The apparatus of claim 16 including: means in the central portion of the second surface providing a concave recess.

* * * * *

PO-1050
(5/69)

UNITED STATES PATENT OFFICE
CERTIFICATE OF CORRECTION

Patent No. 3,842,791　　　　　　　　　Dated October 22, 1974

Inventor(s) Robert J. De brey

It is certified that error appears in the above-identified patent and that said Letters Patent are hereby corrected as shown below:

On the title page, the name of the inventor is incorrectly shown as "Robert J. De Brey" and should be --Robert J. De brey--.

Column 3, line 53, "discl0sure" should be --disclosure--.

Column 5, line 23, "or" should be --of--.

Signed and sealed this 17th day of December 1974.

(SEAL)
Attest:

McCOY M. GIBSON JR.
Attesting Officer

C. MARSHALL DANN
Commissioner of Patents